United States Patent
Hirosaki

(10) Patent No.: US 10,556,274 B2
(45) Date of Patent: *Feb. 11, 2020

(54) CUBIC BORON NITRIDE SINTERED BODY AND CUTTING TOOL

(71) Applicant: KYOCERA CORPORATION, Kyoto-shi, Kyoto (JP)

(72) Inventor: Kouji Hirosaki, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,567

(22) Filed: Oct. 15, 2018

(65) Prior Publication Data

US 2019/0047056 A1    Feb. 14, 2019

Related U.S. Application Data

(63) Continuation of application No. 15/313,815, filed as application No. PCT/JP2015/068549 on Jun. 26, 2015, now Pat. No. 10,124,413.

(30) Foreign Application Priority Data

Jun. 27, 2014    (JP) .................................. 2014-132793

(51) Int. Cl.
*C22C 26/00* (2006.01)
*C04B 35/5831* (2006.01)
(Continued)

(52) U.S. Cl.
CPC ............ *B23B 27/148* (2013.01); *B23B 27/14* (2013.01); *B23B 27/20* (2013.01); *C04B 35/583* (2013.01);
(Continued)

(58) Field of Classification Search
CPC ......... B22F 2005/001; B22F 2302/205; C04B 35/583; C04B 35/5831; C04B 35/6229;
(Continued)

(56) References Cited

U.S. PATENT DOCUMENTS 8,236,411 B2    8/2012   Waki et al.
2007/0227297 A1   10/2007  Noda et al.
(Continued)

FOREIGN PATENT DOCUMENTS

JP    2004-331456 A    11/2004
JP    2010-089223 A    4/2010
(Continued)

OTHER PUBLICATIONS

Extended European Search Report, European Application No. 15812558.3, dated Feb. 8, 2018, 8 pgs.
(Continued)

Primary Examiner — Vanessa T. Luk
(74) Attorney, Agent, or Firm — Volpe and Koening, P.C.

(57) ABSTRACT

A cBN sintered body contains cBN particles whose proportion is 85-97% by volume, and a binding phase whose proportion is 3-15% by volume. The cBN sintered body contains Al whose mass ratio to the entirety of the cBN sintered body is 0.1-5% by mass, and Co whose mass ratio to the Al is 3 to 40, and includes $Al_3B_6Co_{20}$.

8 Claims, 2 Drawing Sheets

(51) Int. Cl.
  *B22F 5/00* (2006.01)
  *B23B 27/14* (2006.01)
  *B23B 27/20* (2006.01)
  *C04B 35/583* (2006.01)
  *C04B 35/63* (2006.01)
  *C04B 35/645* (2006.01)
  *C04B 35/626* (2006.01)

(52) U.S. Cl.
  CPC ...... *C04B 35/5831* (2013.01); *C04B 35/6261* (2013.01); *C04B 35/6303* (2013.01); *C04B 35/645* (2013.01); *C04B 35/6455* (2013.01); *C22C 26/00* (2013.01); *B22F 2005/001* (2013.01); *B22F 2302/205* (2013.01); *C04B 2235/386* (2013.01); *C04B 2235/3847* (2013.01); *C04B 2235/402* (2013.01); *C04B 2235/405* (2013.01); *C04B 2235/5436* (2013.01); *C04B 2235/5445* (2013.01); *C04B 2235/602* (2013.01); *C04B 2235/604* (2013.01); *C04B 2235/6021* (2013.01); *C04B 2235/6022* (2013.01); *C04B 2235/6027* (2013.01); *C04B 2235/612* (2013.01); *C04B 2235/656* (2013.01); *C04B 2235/6562* (2013.01); *C04B 2235/6565* (2013.01); *C04B 2235/6567* (2013.01); *C04B 2235/786* (2013.01); *C04B 2235/80* (2013.01); *C22C 2026/003* (2013.01)

(58) Field of Classification Search
  CPC ........ C04B 35/62865; C04B 35/62866; C04B 2235/386; C04B 2235/402; C04B 2235/405; C04B 2235/6565; C22C 2026/003
  See application file for complete search history.

(56) References Cited

U.S. PATENT DOCUMENTS

| | | |
|---|---|---|
| 2008/0286558 A1 | 11/2008 | Kukino et al. |
| 2013/0174494 A1 | 7/2013 | Twersky et al. |
| 2013/0213197 A1 | 8/2013 | Persson |

FOREIGN PATENT DOCUMENTS

| | | |
|---|---|---|
| JP | 2013-538937 A | 10/2013 |
| WO | 2012/004294 A1 | 1/2012 |

OTHER PUBLICATIONS

Li et al., "Study of high-pressure sintering behavior of cBN composites starting with cBN—Al mixtures," Journal of Materials Research, vol. 23, Issue 9, pp. 2366-2372 (Sep. 2008).

CUBIC BORON NITRIDE SINTERED BODY AND CUTTING TOOL

TECHNICAL FIELD

The present invention relates to a cubic boron nitride sintered body and a cutting tool.

BACKGROUND ART

A cubic boron nitride sintered body (hereinafter usually referred to as "cBN sintered body") has excellent wear resistance and is therefore used as, for example, cutting tools. In particular, the cBN sintered body is widely used to machine cast iron and sintered alloys that are difficult-to-machine materials. For example, Patent Document 1 discloses a cBN sintered body that is composed of a cubic boron nitride (cBN) phase and a binding phase containing W, Co, and Al, and contains $B_6Co_{21}W_2$ at a predetermined ratio as the binding phase. Patent Document 2 discloses a cBN sintered body that contains 80% by weight or more of cBN particles and Al whose content ratio exceeds 50% by weight. The Al is added together with Co as a binding phase.

RELATED ART DOCUMENTS

Patent Documents

Patent Document 1: Japanese Patent Unexamined Patent Publication No. 2004-331456; and
Patent Document 2: Japanese Patent Unexamined Patent Publication No. 2013-538937

SUMMARY OF THE INVENTION

Problems to be Solved by the Invention

However, the cBN sintered bodies respectively disclosed in the above Patent Documents 1 and 2 have poor wear resistance because degranulation of cBN particles is apt to progress. Therefore, the wear resistance required, for example, when used as a cutting tool is far from sufficient.

Means for Solving the Problems

A cBN sintered body according to the present embodiment contains cBN particles whose proportion is 85-97% by volume, and a binding phase whose proportion is 3-15% by volume. An Al content in the cBN sintered body is 0.1-5% by mass. A ratio of a Co content to the Al content is 3 to 40 in terms of mass ratio (Co/Al). The cBN sintered body includes $Al_3B_6Co_{20}$.

Effects of the Invention

With the cBN sintered body according to the present embodiment, adhesion of the binding phase to the cBN particles is improved, deganulation of the cBN particles is inhibited, and excellent wear resistance is achieved. It is consequently possible to provide a cutting tool having excellent wear resistance and a longer service life by using the cBN sintered body as a cutting edge part of the cutting tool.

EMBODIMENTS FOR CARRYING OUT THE INVENTION

Figure 1:
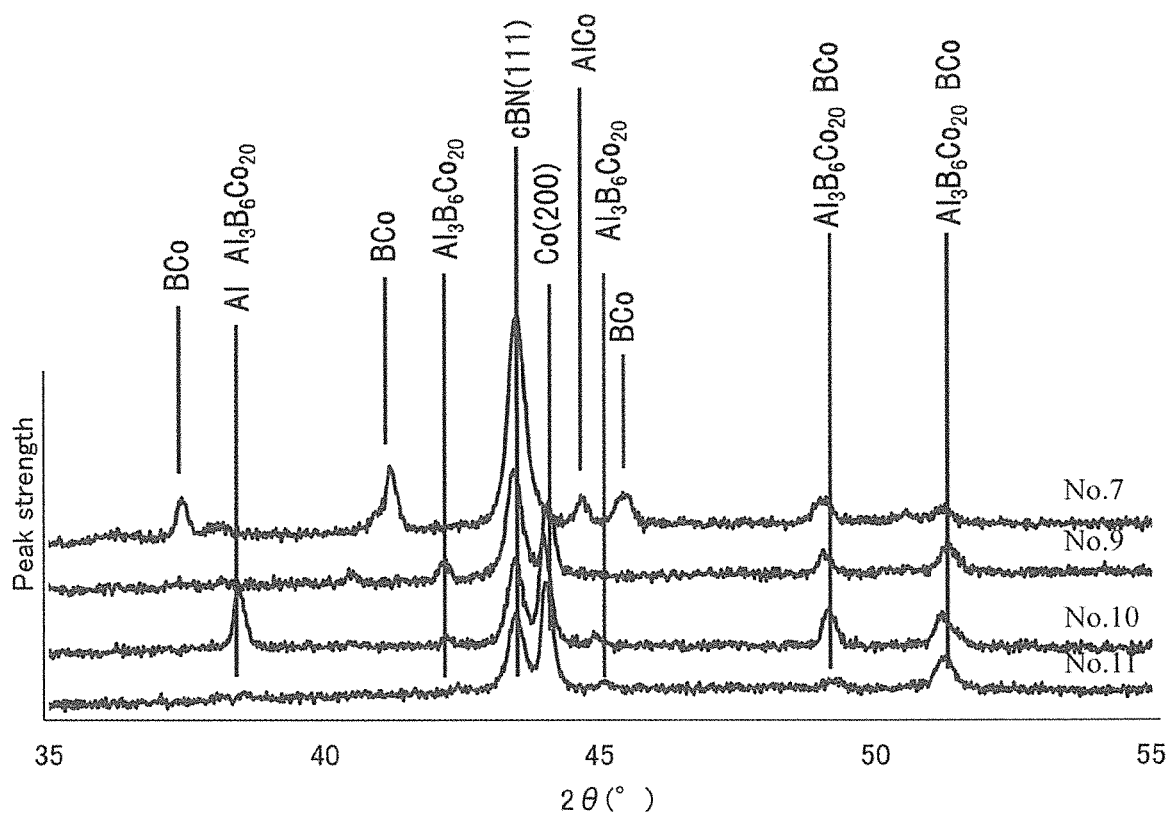
FIG. 1 is X-ray diffraction data about an example of a cBN sintered body of the present embodiment.

A cubic boron nitride sintered body (cBN sintered body) contains cubic boron nitride particles (cBN particles) whose proportion is 85-97% by volume, and a binding phase whose proportion is 3-15% by volume. An Al content in the cBN sintered body is 0.1-5% by mass. A ratio of a Co content to the Al content is 3 to 40 in terms of mass ratio (Co/Al). The cBN sintered body includes $Al_3B_6Co_{20}$.

This improves the adhesion of the binding phase to the cBN particles and inhibits the degranulation of the cBN particles, thereby enhancing the wear resistance of the cBN sintered body of the present embodiment. Accordingly, a cutting tool having, at a cutting edge part thereof, the cBN sintered body of the present embodiment has excellent wear resistance and is therefore usable for a cutting process for a long time. It is also possible to carry out wire electrical discharge machining because the cBN sintered body has a low specific resistance. This makes it possible to manufacture an easy-to-machine cutting tool.

When the proportion of the cBN particles is less than 85% by volume, or the proportion of the binding phase is larger than 15% by volume, hardness of the cBN sintered body is lowered and wear resistance is lowered. When the proportion of the cBN particles is larger than 97% by volume, or the proportion of the binding phase is less than 3% by volume, the adhesion of the binding phase, namely, retention force of the cBN particles is lowered and the degranulation of the cBN particles occurs often, and consequently the wear resistance of the cBN sintered body is lowered. A volume ratio of each of the cBN particles and the binding phase in the cBN sintered body according to the present embodiment is obtainable in the following manner. An area ratio of each of the cBN particles and the binding phase in a cross-sectional photograph of the cBN sintered body is measured, and obtained two-dimensional area ratios are respectively taken as volume ratios of the cBN particles and the binding phase by regarding the two-dimensional area ratio as being the same as the three-dimensional volume ratio. In the measurement of the area ratios, the measurement is made at a plurality of locations, namely, three or more locations, and a mean value thereof is calculated. A preferable content ratio of the cBN particles is 90-96% by volume.

When the Al content in the cBN sintered body is less than 0.1% by mass, no $Al_3B_6Co_{20}$ exists, and the adhesion of the binding phase is lowered, and the wear resistance of the sintered body is lowered. When the Al content is larger than 5% by mass, it becomes difficult to carry out the wire electrical discharge machining. When a ratio of a Co content to the Al content is lower than 3 in terms of mass ratio (Co/Al), no $Al_3B_6Co_{20}$ exists and it becomes difficult to carry out the wire electrical discharge machining. When the ratio of the Co content to the Al content is higher than 40 in terms of mass ratio (Co/Al), the adhesion of the binding phase is lowered, and the wear resistance of the cBN sintered body is deteriorated. A preferable range of the mass ratio (Co/Al) is 5 to 30.

The mean particle size of the cBN particles is 0.2-10 µm, preferably 1-5 µm, particularly preferably 1.5-2.5 m in order to enhance the wear resistance and strength of the cBN sintered body in the present embodiment. The hardness of the cBN sintered body is high and the degranulation of the cBN particles can be inhibited as far as the mean particle size falls in the above range. The measurement of the particle size of the cBN particles in the present embodiment is made according to the method of measuring a mean particle size of cemented carbide as defined in CIS-019D-2005.

The binding phase exists while filling a clearance between the cBN particles, and has a plurality of crystal phases and amorphous phases coexisting therein. All ingredients other than the cBN particles are the binding phase in the present embodiment.

In the present embodiment, as shown in X-ray diffraction data of Cu-Kα ray in FIG. 1, among diffraction peaks of cBN (hereinafter usually referred to simply as "cBN peaks," this being also true for other peaks) in the cBN sintered body, peak strength of a peak belonging to (111) plane of the cBN (hereinafter usually referred to as "cBN (111) peak," this being also true for other peaks) is the strongest. A Co (200) peak exists as a peak belonging to the binding phase.

According to the present embodiment, an $Al_3B_6Co_{20}$ peak exists at, for example, $2\theta=38.5°$, $42.2°$, $45.0°$, $49.2°$, and $51.3°$. Of these peaks, the peak at $2\theta=38.5°$ overlaps with a peak of metal Al. Similarly, the peaks at $2\theta=49.2°$ and $2\theta=51.3°$ overlap with a peak of BCo. Therefore in the present embodiment, a determination whether $Al_3B_6Co_{20}$ exists or not is made by the presence or absence of the peak at either one of $2\theta=42.2°$ and $2\theta=45.0°$, which do not overlap with peaks of other crystal phases. Peak strength of the strongest peak of $Al_3B_6Co_{20}$ is the peak strength at either one of $2\theta=42.2°$ and $2\theta=45.0°$, which has greater strength than the other. Although the peaks whose diffraction angle ($2\theta$) may vary depending on a slight difference of a solid solution state, residual stress, or the like, a determination can be made that the $Al_3B_6Co_{20}$ peak exists as long as the peak of each diffraction angle is detectable.

In the absence of $Al_3B_6Co_{20}$, the adhesion of the binding phase is lowered and the cBN particles are apt to degranulate, and consequently the wear resistance of the cBN sintered body is lowered. Also in the absence of $Al_3B_6Co_{20}$, it may be difficult to carry out the wire electrical discharge machining of the cBN sintered body.

In the present embodiment, the peak strength of the strongest peak of $Al_3B_6Co_{22}$ (at either one of $2\theta=42.2°$ and $2\theta=45.0°$, whose peak strength is higher than that of the other) with respect to the peak strength of cBN (111) is preferably 0.02-0.25. When falling in this range, it is possible to inhibit the degranulation of the cBN particles. A preferable range of the peak strength of the strongest peak of $Al_3B_6Co_{20}$ with respect to the peak strength of cBN (111) is 0.1-0.24.

Although a BCo peak is detectable in the vicinity of $2\theta=42°$ only in Sample No. 7 in FIG. 1, when no BCo peak exists or a strength ratio of the peak strength of the strongest peak of BCo to the peak strength of cBN (111) is 0.05 or less, it is possible to inhibit the degranulation of the cBN particles.

Moreover, when the peak strength of the strongest peak of $Al_3B_6Co_{20}$ with respect to the peak strength of Co (200) is 0.01-0.25, it is possible to inhibit the degranulation of the cBN particles and also carry out the wire electrical discharge machining. When the peak strength of Co (200) with respect to the peak strength of cBN (111) is 0.5-3, it is possible to optimize the wear resistance and specific resistance of the cBN sintered body.

Besides the cBN peak, Co peak, and $Al_3B_6Co_{20}$ peak, a metal Al peak and a BCo peak may exist in the cBN sintered body. Although not being detected in FIG. 1, an AlN peak may exist. In this case, peak strength of the strongest peak of AlN with respect to the peak strength of cBN (111) is preferably 0.05 or less. When falling in this range, it is possible to inhibit the degranulation of the cBN particles and also carry out the wire electrical discharge machining.

The cBN sintered body may further contain W. The W exists as metal W, WC, $W_2B$, $B_6Co_{21}W_2$, or the like. The metal W, WC, $W_2B$, $B_6Co_{21}W_2$, or the like can be confirmed by detection of their respective peaks in the X-ray diffraction data. The cBN sintered body may still further contain Ti and other metal ingredients of periodic tables 4, 5, and 6.

A preferable range of the mean particle size of $Al_3B_6Co_{20}$ particles is 0.02-0.5 m in the present embodiment. This ensures that the $Al_3B_6Co_{20}$ particles establish a strong bond to the cBN particles, thereby inhibiting the degranulation of the cBN particles. The mean particle size of the $Al_3B_6Co_{20}$ particles in the present embodiment is found as a diameter of each particle which is obtainable by converting an area of the particle into a circle from a TEM observation.

Figure 2:
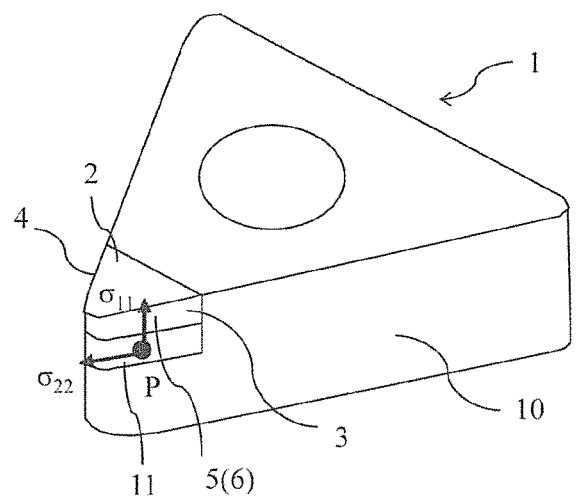
FIG. 2 is a schematic perspective view of an example of a cutting tool using the cBN sintered body of the present embodiment as a cutting edge part.

An example of the cutting tool using the foregoing cBN sintered body as the cutting edge part is described below with reference to FIG. 2. A cutting insert 1 (hereinafter referred to simply as "insert") in FIG. 2 has a cutting edge tip 5 composed of the cBN sintered body 6. The cutting edge tip 5 is brazed to a front end of a tool body 10 with an back body 11 composed of cemented carbide containing WC and Co interposed therebetween. The cutting edge tip 5 constitutes the cutting edge part having a rake surface 2, a flank surface 3, and a cutting edge 4 that is a ridgeline at an intersection of these two surfaces. The tool body 10 is composed of cemented carbide or metal, such as high-speed steel and alloy steel. Although only the cutting edge tip 5 is composed of the cBN sintered body 6 in the insert 1 of FIG. 2, the present embodiment is not limited thereto. Alternatively, the entirety of the cutting insert may be composed of the cBN sintered body 6.

A method for manufacturing the cBN sintered body is described below.

For example, 75-88% by mass of cBN raw material powder whose mean particle size is 1.0-4.5 μm, 10-24.9% by mass of metal Co raw material powder whose mean particle size is 1.0-2.5 μm, 0.1-5% by mass of metal Al raw material powder whose mean particle size is 0.5-1.8 μm, and 0-20% by mass of WC raw material powder whose mean particle size is 0.3-1.5 m are prepared. In the present embodiment, a ratio (cBN/Al) of the mean particle size of the cBN raw material powder and the mean particle size of the Al raw material powder is set to 1.0-3.0, and a ratio (Co/Al) of the mean particle size of the Al raw material powder and the mean particle size of the Co raw material powder is set to 0.7-1.6.

These prepared powders are pulverized and mixed together by a ball mill for 15-72 hours, followed by molding into a predetermined shape as needed. The molding can be carried out using well-known molding means, such as press molding, injection molding, slip casting, and extrusion molding.

Subsequently, this is loaded into an ultra-high pressure heating apparatus together with a separately prepared back support body made of cemented carbide, and is held at a predetermined temperature in a range of 1450-1700° C. at a pressure of 4-7 GPa for 10-60 minutes. The temperature is dropped at a rate of 3° C./sec or less. This ensures that an abundance ratio of the cBN particles in the cBN sintered body can be controlled in a predetermined range. This also allow the existence of $Al_3B_6Co_{20}$.

In other words, when the mixing ratios of the raw material powders are out of the above-mentioned ranges, the abundance ratio of the cBN particles in the cBN sintered body is out of the predetermined range, or no $Al_3B_6Co_{20}$ exists. When the ratio of the mean particle size of the cBN raw material powder and the mean particle size of the Al raw material powder, and the ratio of the mean particle size of the Al raw material powder and the mean particle size of the Co raw material powder are out of the above-mentioned ranges, the abundance ratio of the cBN particles in the cBN sintered body is out of the predetermined range, or no $Al_3B_6Co_{20}$ exists. When the temperature drop rate is larger than 3° C./sec, there occurs no deposition of $Al_3B_6Co_{20}$.

The cutting edge part with a predetermined size is cut out from the manufactured cBN sintered body by the wire electrical discharge machining. The cBN sintered body of the present embodiment has a specific resistance that makes it possible to carry out the wire electrical discharge machining. Subsequently, the cutting edge part so cut out is brazed to a cutout step part formed at a corner part of a front end of a tool body made of cemented carbide. Thereafter, an upper surface of the brazed insert is subjected to a grinding process, and a side surface of the cutting edge part is then subjected to a grinding process together with a protruded part of the cBN sintered body. Further, if desired, a cutting edge tip portion is subjected to a honing process, thereby manufacturing the cutting tool of the present embodiment.

EXAMPLES

Firstly, cBN powder, metal Co powder, metal Al powder, and WC powder, which respectively had mean particle size presented in Table 1 were mixed into a composition presented in Table 1. The powder so obtained was mixed by a ball mill using alumina balls for 15 hours. The mixed powder was then subjected to press molding at a pressure of 98 MPa. The molded body and a back support body were stackedly set into the ultra-high pressure heating apparatus. After raising temperature at 120° C./min and holding at a pressure of 5 GPa at 1450° C. for 15 minutes, the temperature was dropped at a temperature drop rate presented in Table 1, thereby obtaining a cBN sintered body.

Subsequently, an integrated object of the manufactured cBN sintered body and an back body was cut into a predetermined shape by the wire electrical discharge machining. The results of machinability of the wire electrical discharge machining were presented in Table 3, in which a sample that had satisfactory machinability was indicated by symbol "O", a sample that needed time to achieve the machining was indicated by symbol "A", and a sample that could not be machined was indicated by symbol "x". In the cutout step part formed at the cutting edge tip portion of the tool body made of the cemented carbide, a lower surface of the back body was brazed to a surface of the cutout step part of the tool body, and the cBN sintered body so cut out was made into a cutting edge part. The cutting edge part of the cBN sintered body was subjected to cutting edge processing (chamfer honing and round honing) by using a diamond wheel, thereby manufacturing a cutting insert of JIS.CNGA120408 shape.

A content ratio of the cBN particles in the cBN sintered body of the cutting edge part in the obtained insert was calculated from a structure observation of an arbitrary cross section of the cBN sintered body by using a scanning electron microscope (SEM). Additionally, a mean particle size of the cBN particles was measured according to the method of measuring a mean particle size of cemented carbide as defined in CIS-019D-2005. The results were presented in Table 1. In a structure photograph, regions other than the cBN particles were regarded as the binding phase.

Further, the composition of the cBN sintered body was checked by an ICP analysis, and a content ratio of each of Co, Al, and W to the entirety of the cBN sintered body was measured. The results were presented in Table 2.

Crystal phases in the cBN sintered body were specified by making an X-ray diffraction measurement from the rake surface and the flank surface by using a D8 DISCOVER with GADDS Super Speed, manufactured by Bruker AXS K.K, radiation source: $CuK_\alpha$, and collimator diameter: 0.8 mm. Table 3 presented peak strength of the strongest peak of peaks belonging to each crystal phase when peak strength of cBN (111) was 1. XRD charts in FIG. 1 are XRD charts of Samples Nos. 7, 9, 10, and 11.

A cutting test was conducted using the obtained cutting inserts under the following cutting conditions. The results were presented in Table 3.
Cutting method: external turning
Work material: FC250 sleeve material
Cutting speed: 700 m/min
Feed rate: 0.2 mm/rev
Depth of cut: 0.2 mm
Cutting state: under wet condition (with cutting oil)
Evaluation method: A cutting length before occurrence of wear or fracture was evaluated.

TABLE 1

| | Mixed composition (Mean particle size: μm, Additive amount: % by mass) | | | | | | | | Ratio of mean particle sizes of raw material powders | | Temperature drop rate |
| | cBN | | Co | | Al | | WC | | | | |
| Sample No. | Mean particle size | Additive amount | Mean particle size | Additive amount | Mean particle size | Additive amount | Mean particle size | Additive amount | cBN/Al | Co/Al | (° C./sec.) |
| --- | --- | --- | --- | --- | --- | --- | --- | --- | --- | --- | --- |
| 1 | 3.2 | 63.6 | 1.3 | 34.1 | 1.5 | 2.3 | — | — | 2.1 | 0.9 | 2.0 |
| 2 | 3.2 | 71.2 | 1.3 | 27.0 | 1.5 | 1.8 | — | — | 2.1 | 0.9 | 2.0 |
| 3 | 3.2 | 76.3 | 1.3 | 22.2 | 1.5 | 1.5 | — | — | 2.1 | 0.9 | 2.0 |
| 4 | 3.2 | 86.1 | 1.3 | 6.9 | 1.5 | 0.3 | 0.5 | 6.7 | 2.1 | 0.9 | 2.0 |
| 5 | 3.2 | 93.4 | 1.3 | 6.2 | 1.5 | 0.4 | — | — | 2.1 | 0.9 | 2.0 |
| 6 | 3.2 | 95.5 | 1.3 | 4.2 | 1.5 | 0.3 | — | — | 2.1 | 0.9 | 2.0 |
| 7 | 3.2 | 87.0 | 1.3 | 7.6 | 1.5 | 5.4 | — | — | 2.1 | 0.9 | 2.0 |
| 8 | 3.2 | 84.1 | 1.3 | 12.2 | 1.5 | 3.7 | — | — | 2.1 | 0.9 | 2.0 |
| 9 | 3.2 | 81.2 | 1.3 | 16.6 | 1.5 | 2.2 | — | — | 2.1 | 0.9 | 2.0 |
| 10 | 3.2 | 80.0 | 1.3 | 18.6 | 1.5 | 1.4 | — | — | 2.1 | 0.9 | 2.0 |
| 11 | 3.2 | 78.7 | 1.3 | 20.6 | 1.5 | 0.7 | — | — | 2.1 | 0.9 | 2.0 |

TABLE 1-continued

| | Mixed composition (Mean particle size: μm, Additive amount: % by mass) | | | | | | | | Ratio of mean particle sizes of raw material powders | | |
|---|---|---|---|---|---|---|---|---|---|---|---|
| | cBN | | Co | | Al | | WC | | | | |
| Sample No. | Mean particle size | Additive amount | Mean particle size | Additive amount | Mean particle size | Additive amount | Mean particle size | Additive amount | cBN/Al | Co/Al | Temperature drop rate (° C./sec.) |
| 12 | 3.2 | 78.5 | 1.3 | 21.0 | 1.5 | 0.5 | — | — | 2.1 | 0.9 | 2.0 |
| 13 | 3.2 | 78.3 | 1.3 | 21.3 | 1.5 | 0.4 | — | — | 2.1 | 0.9 | 2.0 |
| 14 | 3.2 | 77.5 | 1.3 | 22.5 | 1.5 | — | — | — | 2.1 | 0.9 | 2.0 |
| 15 | 3.2 | 68.1 | 1.3 | 4.4 | 1.5 | 0.12 | 0.5 | 27.4 | 2.1 | 0.9 | 2.0 |
| 16 | 3.2 | 80.0 | 2.5 | 18.6 | 1.5 | 1.4 | — | — | 2.1 | 1.7 | 2.0 |
| 17 | 3.2 | 76.2 | 1.3 | 18.8 | 1.5 | 5.0 | — | — | 2.1 | 0.9 | 2.0 |
| 18 | 3.2 | 77.4 | 1.3 | 16.9 | 1.5 | 5.7 | — | — | 2.1 | 0.9 | 2.0 |
| 19 | 3.2 | 80.0 | 1.3 | 18.6 | 1.5 | 1.4 | — | — | 2.1 | 0.9 | 4.0 |
| 20 | 3.2 | 80.0 | 3.0 | 18.6 | 1.5 | 1.4 | — | — | 2.1 | 2.0 | 2.0 |
| 21 | 2.0 | 82.4 | 1.5 | 10.8 | 4.0 | 3.4 | 2.0 | 3.4 | 0.5 | 0.4 | 2.0 |
| 22 | 2.0 | 82.4 | 1.5 | 10.6 | 3.5 | 3.4 | 1.5 | 3.4 | 0.6 | 0.4 | 2.0 |
| 23 | 2.3 | 82.4 | 1.5 | 10.8 | 1.5 | 3.4 | 1.0 | 3.4 | 1.5 | 1.0 | 2.0 |
| 24 | 3.2 | 81.2 | 1.3 | 16.6 | 1.5 | 2.5 | — | — | 2.1 | 0.9 | 2.0 |
| 25 | 4.5 | 81.2 | 2.5 | 20.0 | 0.9 | 0.5 | — | — | 5.0 | 2.8 | 2.0 |

TABLE 2

| | cBN sintered body | | | | | | | |
|---|---|---|---|---|---|---|---|---|
| | Content ratio (% by volume) | | Mean particle size of cBN particles (μm) | Mean particle size of $Al_3B_6Co_{20}$ particles (μm) | Content ratio (% by mass) | | | |
| Sample No. | cBN particles | Binding phase | | | Co | Al | W | Co/Al |
| 1 | 80 | 20 | 2.5 | 0.6 | 34.1 | 2.3 | — | 14.8 |
| 2 | 85 | 15 | 2.3 | 0.2 | 27.0 | 1.8 | — | 15.0 |
| 3 | 88 | 12 | 2.2 | 0.2 | 22.2 | 1.5 | — | 14.8 |
| 4 | 95 | 5 | 2.1 | 0.1 | 6.9 | 0.3 | 1.6 | 23.0 |
| 5 | 97 | 3 | 2.0 | 0.1 | 6.2 | 0.4 | — | 15.5 |
| 6 | 98 | 2 | 1.9 | 0.01 | 4.2 | 0.3 | — | 14.0 |
| 7 | 90 | 10 | 2.5 | — | 7.6 | 5.4 | — | 1.4 |
| 8 | 90 | 10 | 2.0 | 0.05 | 12.2 | 3.7 | — | 3.0 |
| 9 | 90 | 10 | 2.2 | 0.4 | 16.6 | 2.2 | — | 7.5 |
| 10 | 90 | 10 | 2.2 | 0.3 | 18.6 | 1.4 | — | 13.3 |
| 11 | 90 | 10 | 2.3 | 0.2 | 20.6 | 0.7 | — | 29.4 |
| 12 | 90 | 10 | 2.4 | 0.04 | 21.0 | 0.5 | — | 40.0 |
| 13 | 90 | 10 | 2.4 | — | 21.3 | 0.4 | — | 45.0 |
| 14 | 90 | 10 | 2.0 | — | 22.5 | — | — | — |
| 15 | 90 | 10 | 2.0 | 0.02 | 4.4 | 0.12 | 27.4 | 36.3 |
| 16 | 90 | 10 | 2.0 | 0.1 | 18.6 | 1.4 | — | 13.3 |
| 17 | 85 | 15 | 2.0 | 0.1 | 18.8 | 5.0 | — | 3.8 |
| 18 | 85 | 15 | 2.0 | — | 16.9 | 5.7 | — | 3.0 |
| 19 | 90 | 10 | 2.0 | — | 18.6 | 1.4 | — | 13.3 |
| 20 | 90 | 10 | 2.0 | — | 18.6 | 1.4 | — | 13.3 |
| 21 | 90 | 10 | 1.4 | — | 10.8 | 3.5 | — | 3.1 |
| 22 | 90 | 10 | 1.4 | 0.6 | 10.6 | 3.4 | — | 3.1 |
| 23 | 90 | 10 | 1.5 | 0.1 | 10.8 | 3.5 | — | 3.1 |
| 24 | 90 | 10 | 2.2 | 0.1 | 16.6 | 2.5 | — | 6.6 |
| 25 | 90 | 10 | 3.0 | 0.01 | 20.0 | 0.5 | — | 40.0 |

TABLE 3

| | Ratio of strength of strongest peak XRD (Ratio to peak strength of cBN(111)) | | | | Ratio of ratios of peak strengths of $Al_3B_6Co_{20}$/Co | Wire electrical discharge machining performance | Cutting length (km) |
|---|---|---|---|---|---|---|---|
| Sample No. | $Al_3B_6Co_{20}$ | Co (200) | AlN | BCo | | | |
| 1 | 0.25 | 1.2 | — | 0.28 | 0.21 | ○ | 5.9 |
| 2 | 0.17 | 1.2 | — | 0.07 | 0.14 | ○ | 9.1 |

TABLE 3-continued

| Sample No. | Ratio of strength of strongest peak XRD (Ratio to peak strength of cBN(111)) | | | | Ratio of ratios of peak strengths of $Al_3B_6Co_{20}$/Co | Wire electrical discharge machining performance | Cutting length (km) |
|---|---|---|---|---|---|---|---|
| | $Al_3B_6Co_{20}$ | Co (200) | AlN | BCo | | | |
| 3 | 0.15 | 1.2 | — | — | 0.13 | ○ | 12.0 |
| 4 | 0.10 | 1.2 | — | — | 0.08 | ○ | 14.7 |
| 5 | 0.06 | 1.2 | — | — | 0.05 | Δ | 9.5 |
| 6 | 0.02 | 1.2 | — | — | 0.02 | Δ | 4.5 |
| 7 | — | — | — | 0.25 | — | X | — |
| 8 | 0.05 | 0.5 | — | — | 0.10 | Δ | 7.7 |
| 9 | 0.24 | 1.0 | — | — | 0.24 | ○ | 13.8 |
| 10 | 0.20 | 1.2 | — | — | 0.17 | ○ | 14.0 |
| 11 | 0.16 | 1.3 | — | — | 0.12 | ○ | 13.7 |
| 12 | 0.04 | 1.5 | 0.10 | — | 0.03 | ○ | 7.6 |
| 13 | — | 1.5 | 0.22 | — | — | ○ | 4.3 |
| 14 | — | 2.0 | — | 0.17 | — | ○ | 2.8 |
| 15 | 0.01 | 1.1 | — | — | 0.01 | ○ | 9.3 |
| 16 | 0.18 | 1.5 | — | — | 0.12 | ○ | 13.1 |
| 17 | 0.11 | 0.8 | — | — | 0.14 | Δ | 9.7 |
| 18 | — | 0.6 | — | — | — | X | — |
| 19 | — | 1.0 | — | 0.12 | — | Δ | 6.8 |
| 20 | — | 1.0 | — | — | — | Δ | 6.6 |
| 21 | — | 1.0 | — | — | — | Δ | 6.2 |
| 22 | 0.11 | 0.4 | — | — | 0.28 | Δ | 7.5 |
| 23 | 0.05 | 1.0 | — | — | 0.05 | ○ | 9.0 |
| 24 | 0.27 | 1.1 | — | — | 0.25 | ○ | 7.8 |
| 25 | 0.01 | 3.2 | — | — | 0.003 | ○ | 7.2 |

The results presented in Tables 1 to 3 show the following. In Sample No. 1 in which the content of the cBN particles was less than 85% by volume and the content ratio of the binding phase was larger than 15% by volume, the wear resistance was lowered, and the cutting length was short. In Sample No. 6 in which the content of the cBN particles was larger than 97% by volume and the content ratio of the binding phase was less than 3% by volume, the degranulation of the cBN particles occurred often, the wear resistance was lowered, and the cutting length was short. In Sample No. 7 in which the ratio of the content of Co and the content of Al (Co/Al) was smaller than 3, and in Sample No. 18 in which the content of Al was larger than 5% by mass, no $Al_3B_6Co_{20}$ existed, and the wire electrical discharge machining could not be carried out. In Sample No. 13 in which the ratio of the content of Co and the content of Al (Co/Al) was larger than 40, and in Sample No. 14 in which the content of Al was less than 0.1% by mass, no $Al_3B_6Co_{20}$ existed, and the cutting length was short. In Samples Nos. 19-21, no $Al_3B_6Co_{20}$ existed, the wire electrical discharge machining performance was poor, and the cutting length was short.

In contrast, in Samples Nos. 2-5, 8-12, 15-17, and 22-25 in which 85-97% by volume of the cBN particles and 3-15% by volume of the binding phase were contained, the Al content was 0.1-5% by mass, the ratio of the Co content to the Al content (Co/Al) was 3-40, and $Al_3B_6Co_{20}$ existed, the wire electrical discharge machining could be carried out, wear resistance was excellent, and the cutting length was long.

In Samples Nos. 2-5, 8-12, 15-17, and 22-25, particularly each of Samples Nos. 2-5, 8-12, 16, 17, 22, and 23 in which the peak strength of the strongest peak of $Al_3B_6Co_{20}$ with respect to the peak strength of cBN (111) was 0.02-0.25 in the X-ray diffraction measurement, the wire electrical discharge machining could be carried out and the cutting length was long. In Samples Nos. 2-5, 8-12, 15-17, 23, and 24 in which the peak strength of Co (200) with respect to the peak strength of cBN (111) was 0.5-0.3, the wire electrical discharge machining could be carried out, and the cutting length was long.

Further, in Samples Nos. 2-5, 8-12, 15-17, 23, and 24 in which the strongest peak of $Al_3B_6Co_{20}$ with respect to the peak strength of Co (200) was 0.01-0.25, the wire electrical discharge machining could be carried out, and the cutting length was long.

In Samples Nos. 2-5, 8-11, 15-17, and 22-25 in which a peak of AlN did not exist or existed when a strength ratio of the peak strength of the strongest peak of AlN to the peak strength of cBN (111) was 0.05 or less, and in Samples Nos. 3-5, 8-12, 15-17, and 22-25 in which a peak of BCo did not exist or existed when a strength ratio of the peak strength of the strongest peak of BCo to the peak strength of cBN (111) was 0.05 or less, the wire electrical discharge machining could be carried out, and the cutting length was long.

In Samples Nos. 2-5, 8-12, 15-17, 23, and 24 in which the mean particle size of the cBN particles was 1.5-2.5 m and the mean particle size of the $Al_3B_6Co_{20}$ particles was 0.02-0.5 μm, the wire electrical discharge machining could be carried out, the wear resistance was excellent, and the cutting length was long.

DESCRIPTION OF THE REFERENCE NUMERAL

1: insert (cutting insert)
2: rake surface
3: flank surface
4: cutting edge
5: cutting edge part
6: cBN sintered body

The invention claimed is:

1. A cBN sintered body, comprising:
cBN particles;
$Al_3B_6Co_{20}$, an Al content in the cBN sintered body is 0.1-5% by mass and a ratio of a Co content to the Al content is 3 to 40 in terms of mass ratio; and
a binding phase.

2. The cBN sintered body according to claim 1, wherein a ratio of peak strength of a strongest peak of the $Al_3B_6Co_{20}$ to peak strength of cBN (111) is 0.02-0.25 in an X-ray diffraction measurement.

3. The cBN sintered body according to claim 1, wherein a ratio of peak strength of a strongest peak of the $Al_3B_6Co_{20}$ to peak strength of Co (200) is 0.01-0.25 in an X-ray diffraction measurement.

4. The cBN sintered body according to claim 1, wherein a ratio of peak strength of the Co (200) to peak strength of cBN (111) is 0.5-3 in an X-ray diffraction measurement.

5. The cBN sintered body according to claim 1, wherein no peak of AlN exists, or a ratio of peak strength of a strongest peak of AlN to peak strength of cBN (111) is 0.05 or less in an X-ray diffraction measurement.

6. The cBN sintered body according to claim 1, wherein no peak of BCo exists, or a ratio of peak strength of a strongest peak of BCo to peak strength of cBN (111) is 0.05 or less in an X-ray diffraction measurement.

7. The cBN sintered body according to claim 1, wherein a mean particle size of the cBN particles is 1.5-2.5 μm and a mean particle size of $Al_3B_6Co_{20}$ particles is 0.02-0.5 μm.

8. A cutting tool, comprising a cutting edge part composed of the cBN sintered body according to claim 1.

* * * * *